(12) United States Patent
Benjelloun Mlayah et al.

(10) Patent No.: US 11,274,209 B2
(45) Date of Patent: Mar. 15, 2022

(54) PROCESS FOR THE SIMULTANEOUS EXTRACTION OF LIGNIN AND SILICA FROM BIOMASS AND ELASTOMER REINFORCED WITH A MIXTURE OF LIGNIN AND SILICA

(71) Applicant: COMPAGNIE INDUSTRIELLE DE LA MATIERE VEGETALE—CIMV, Neuilly sur Seine (FR)

(72) Inventors: Bouchra Benjelloun Mlayah, Pompertuzat (FR); Michel Delmas, Auzeville-Tolosane (FR); Nadja Cachet, Sainte Foy d'Aigrefeuille (FR)

(73) Assignee: COMPAGNIE INDUSTRIELLE DE LA MATIERE VEGETALE-CIMV, Neuilly sur Seine (FR)

( * ) Notice: Subject to any disclaimer, the term of this patent is extended or adjusted under 35 U.S.C. 154(b) by 0 days.

(21) Appl. No.: 16/491,571

(22) PCT Filed: Feb. 16, 2018

(86) PCT No.: PCT/EP2018/053868
§ 371 (c)(1),
(2) Date: Sep. 6, 2019

(87) PCT Pub. No.: WO2018/162207
PCT Pub. Date: Sep. 13, 2018

(65) Prior Publication Data
US 2020/0157352 A1    May 21, 2020

(30) Foreign Application Priority Data
Mar. 8, 2017 (EP) ..................... 17159836

(51) Int. Cl.
*C07G 1/00* (2011.01)
*C01B 33/12* (2006.01)
*C08L 97/00* (2006.01)

(52) U.S. Cl.
CPC ............ *C08L 97/005* (2013.01); *C01B 33/12* (2013.01); *C07G 1/00* (2013.01)

(58) Field of Classification Search
CPC ..... C08L 97/005; C08L 2666/58; C07G 1/00; C01B 33/12
See application file for complete search history.

(56) References Cited

U.S. PATENT DOCUMENTS

| 5,735,916 | A | 4/1998 | Lucas et al. |
| 2015/0152255 | A1 | 6/2015 | Benjelloun Mlayah et al. |
| 2017/0253740 | A1 | 9/2017 | Murai et al. |

FOREIGN PATENT DOCUMENTS

| CN | 101235604 | 8/2008 |
| WO | WO2010/012124 | 2/2010 |
| WO | WO2017/042011 | 3/2017 |

*Primary Examiner* — Wenwen Cai
(74) *Attorney, Agent, or Firm* — CRGO Global; Steven M. Greenberg

(57) ABSTRACT

The invention relates to a process for the simultaneous extraction of lignin and silica from lignocellulosic plant material, characterized in that it comprises the steps of:
a) fractionating the lignocellulosic plant material in the presence of an acid solution, so as to obtain a solid fraction comprising cellulose, residual lignin and silica;
b) extracting simultaneously lignin and silica from the solid fraction obtained in step a) with a basic solution, at a pH between 10 and 13 and at a temperature between 70° C. and 90° C., so as to obtain a liquid phase comprising lignin and silica, and a solid phase;
c) separating the liquid phase and of the solid phase obtained in step b),
d) coprecipitating a mixture of lignin and silica comprised in the liquid phase, at a pH between 5 and 6.

8 Claims, 1 Drawing Sheet

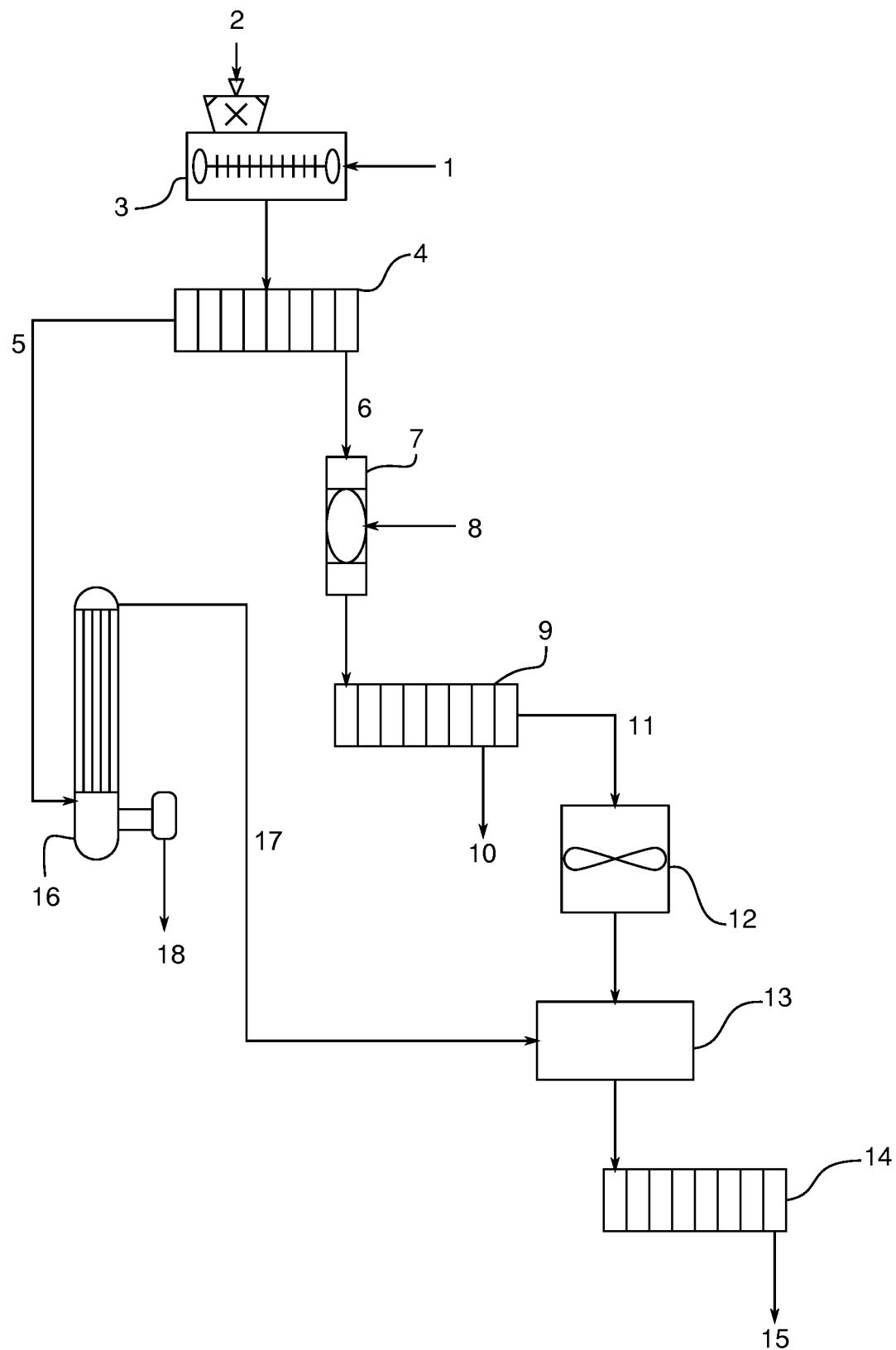

US 11,274,209 B2

PROCESS FOR THE SIMULTANEOUS EXTRACTION OF LIGNIN AND SILICA FROM BIOMASS AND ELASTOMER REINFORCED WITH A MIXTURE OF LIGNIN AND SILICA

CROSS-REFERENCE TO RELATED APPLICATIONS

This application is a § 371 national phase entry of International Application No. PCT/EP2018/053868, filed Feb. 16, 2018, which claims priority to European Patent Application No. 17159836.0, filed Mar. 8, 2017.

TECHNICAL FIELD OF THE INVENTION

The invention relates to a process for the simultaneous extraction of a lignin and a silica, in particular a chemically unmodified lignin and silica, from lignocellulosic plant material and the use of the mixture obtained as a reinforcing filler for the mechanical reinforcement of elastomer polymers.

TECHNICAL BACKGROUND

Filler reinforcement of elastomers is an area of interest in various industries such as to the rubber industry. Filled rubber is widely used for applications such as tyres and anti-vibration applications systems. Two of the most commonly encountered fillers are carbon black and silica.

Silica is used as an active filler in elastomers. It may be used as such or silanized before use. Silanizing the silica reduces the vulcanization time of the elastomer and increases the filler/polymer matrix interaction.

Elastomer formulations usually contain less than 100 parts per hundred of rubber (PHR) of active charge (i.e. carbon black or silica). In general, the mixtures contain about 50 PHR of active charge. These fillers are composed of 0 to 100% of silica.

The best compromise between the addition of silica and the mechanical properties of the elastomer is obtained for 20 to 30 PHR of silica (and 30 to 20 PHR of carbon black). This amount may vary depending on the nature of the elastomeric matrix used.

Thus, in most cases, the best formulation is obtained with a 50/50 carbon black/silica mixture.

The addition of silica to the formulations makes it possible to increase:
the hardness (or stiffness),
the tensile strength, and
the elongation at break,
of the elastomer formulation.

The silica used in elastomers is usually of mineral origin. However, there exists another important source of silica. Cereals are a rich source of silica. For example, rice straw can comprise more than 10% of silica. Consequently, the straw and the chaff of cereals represent an important source of silica. In fact, these wastes materials are very little used and when they are used, their use is often limited by the presence of silica. The silica is in particular a major obstacle to the use of cereal straw in the production of paper pulp. The most common technique for the extraction of silica from plant wastes is their combustion. However, the quality of the silica obtained by combustion is poor. The reason is that the silica obtained by combustion exhibits a low purity and the silica particles have high diameters. In addition, the combustion of these wastes has a negative impact on the environment as it results in emissions of sulphur and nitrogen oxide. Furthermore, the combustion of these wastes results in the loss of advantageous organic compounds which could be recycled.

Carbon black is produced by incomplete combustion of heavy petroleum products. Its replacement, partially or totally, by a biosourced filler having at least the same reinforcing properties, is of high interest.

The use of a chemically unmodified, non degraded and pure lignin (hereafter Biolignin™) as a replacement for carbon black for the mechanical reinforcement of elastomer polymers, has already been described in WO 2014/012924. The specific physicochemical properties of the unmodified lignin in WO 2014/012924 confirmed its potential as an excellent carbon black substitute for mechanical reinforcement in polymeric elastomer structures.

There is thus a need to provide a process for obtaining an environmental friendly bio-sourced product derived from plant material, for example from an agricultural by-product, said bio-sourced product being able to improve the mechanical reinforcement of elastomer polymers, in particular, the hardness or stiffness, tensile strength and elongation at break.

There is further a need for an environmental friendly bio-sourced product derived from plant material, for use as a reinforcing filler for the mechanical reinforcement of elastomer polymers in replacement of carbon black, which is produced by incomplete combustion of heavy petroleum products.

SUMMARY OF THE INVENTION

The present invention relates to a process for the simultaneous extraction of lignin and silica, in particular a mixture of a chemically unmodified lignin and silica, more particularly a mixture of Biolignin™ and silica, from lignocellulosic plant material.

The present invention also relates to the use of a mixture of lignin and silica, in particular a mixture of a chemically unmodified lignin and silica, more particularly a mixture of Biolignin™ and silica, obtained by the process of the invention, as a reinforcing filler for the mechanical reinforcement of elastomer polymers.

The present invention further relates to an elastomer comprising a mixture of lignin and silica, in particular a mixture of a chemically unmodified lignin and silica, more particularly a mixture of Biolignin™ and silica, obtained by the process of the invention.

The present invention still further relates to a mixture of lignin and silica, in particular a mixture of a chemically unmodified lignin and silica, more particularly a mixture of Biolignin™ and silica, obtained by the process of the invention.

DETAILED DESCRIPTION OF THE INVENTION

The present invention relates to a process for the simultaneous extraction of lignin and silica from lignocellulosic plant material, characterized in that it comprises the steps of:
a) fractionating the lignocellulosic plant material in the presence of an acid solution, so as to obtain a solid fraction comprising mainly cellulose, residual lignin and silica;
b) extracting simultaneously lignin and silica from the solid fraction obtained in step a) with a basic solution, at a pH between 10 and 13 and at a temperature between 70° C. and 90° C., so as to obtain a liquid phase comprising lignin and silica, and a solid phase;

c) separating the liquid phase and of the solid phase obtained in step b), d) coprecipitating a mixture of lignin and silica which is comprised in the liquid phase, at a pH between 5 and 6.

The present invention also relates to the mixture of lignin and silica obtained according to this process.

The lignin extracted simultaneously with silica according to the process of the invention is preferably a chemically unmodified lignin, and more preferably Biolignin™. Such lignins are well depicted in WO 2014/012924.

The first step of the process according to the invention comprises fractionating the lignocellulosic plant material in the presence of an acid solution, so as to obtain a solid fraction comprising cellulose.

The lignocellulosic plant material can be any type of lignocellulosic plant material which comprises lignin and silica. In particular, the lignocellulosic plant material can be cereal straw and/or chaff. Cereals are rich in lignin and silica. The straw and the chaff which are agricultural by-products, are thus valorized. The cereals used in the process according to the invention can, for example, be wheat, rice, maize or barley, rye, oats, triticale, etc. Thus, the lignocellulosic plant material can be wheat or rice straw and/or wheat or rice chaff. According to an embodiment, the lignocellulosic plant material is wheat straw. According to another embodiment, the lignocellulosic plant material is rice straw. The latter is particularly rich in silica.

Prior to the fractionating step, care is taken so that the humidity of the lignocellulosic plant material is less than or equal to 25% by weight of water with respect to the dry material. The lignocellulosique raw material is preferably ground and reduced to fragments or slivers or chips of substantially between 0.5 and 20 cm in length. Before the fractionating step, it is also possible to carry out the lignocellulosic plant material may be preimpregnated a temperature at least 30° C. lower than the reaction temperature. The impregnation by immersion can be carried out during 10 to 30 minutes in a formic acid/acetic acid mixture. The impregnation and fractionation reactions are preferably carried out under atmospheric pressure.

Fractionating lignocellulosic plant material in the presence of an acid solution is known. Such fractionations and the steps prior to this fractionation are in particular described in WO00/68494, WO2009/092749 and WO2012/049054 of Compagnie Industrielle de la Matière Végétale (CIMV).

Fractionating plant material in an acid medium retains a part of lignin and silica in the solid fraction comprising cellulose, making it possible to extract them at a subsequent step. This type of fractionation is contrary to the general practice which, in the case of plant material having a high silica content, recommends carrying out a fractionation in a basic medium in order to remove the silica right from the step of fractionation of the cellulose and thus to prevent the silica from interfering with the extraction of the cellulose, the sugars and the lignin present in the plant material.

According to a preferred embodiment, the fractionating step a) comprises the steps of:

a1) bringing the lignocellulosic plant material into contact with an acid solution so as to obtain a solid fraction comprising cellulose and a liquid fraction, a2) separating the solid fraction and the liquid fraction obtained in step a1).

The operation in which the lignocellulosic plant material is brought into contact with an acid solution can be carried out at a temperature between 50° C. and 115° C., preferably between 95° C. and 110° C.

Preferably, the operation in which the lignocellulosic plant material is brought into contact with an acid solution lasts from 1 to 3 hours.

The acid solution of the fractionating step a) can comprise at least one organic acid. The acid solution of the fractionating step a) can in particular comprise formic acid and/or acetic acid.

According to a preferred embodiment, the acid solution of the fractionating step a) is a solution of organic acid(s), preferably a solution of formic acid and acetic acid. Preferably, the acid solution of the fractionating step a) is a mixture of formic acid and acetic acid. This mixture of formic acid and acetic acid can comprise at least 50% by weight of acetic acid and at least 20% by weight of formic acid.

Fractionating with a mixture of acetic acid and formic acid makes it possible to avoid damaging the cellulose fibres which occurs with concentrated formic acid alone under the normal conditions of use. The quality of the cellulose pulp which will be obtained from the solid fraction comprising cellulose after the extraction of silica and lignin is thus preserved. The quality of the products, i.e. lignin and sugars which will be obtained from the liquid fraction is also preserved.

According to a preferred embodiment, the lignocellulosic plant material is brought into contact with a mixture of formic acid comprising at least 5% by weight of acetic acid. The combination is brought to a reaction temperature of between 50° C. and 115° C.

The solid fraction is subsequently separated from the liquid fraction comprising in particular, in solution, the starting formic acid and acetic acid, dissolved monomeric and polymeric sugars, lignins and acetic acid which result from the starting lignocellulosic plant material.

Typically, the liquid fraction obtained during the separating step a1) comprises lignin. It can also comprise sugar and/or hemicellulose. This liquid fraction can be subjected to various treatments in order to recover some of the compounds which it comprises. In particular, it can be treated, for example by evaporation, in order to recycle the acid solution. Thus, if a mixture of acetic acid and formic acid is used during step a), it can be extracted from the liquid fraction obtained in step a2). This mixture can then be recycled in the steps requiring the addition of an acid solution of this type.

The lignin and the sugars of this liquid fraction can also be purified. The sugar thus purified can in particular be fermented in order to obtain ethanol. Processes for the purification of lignin and sugar from such a liquid fraction are known. They are in particular described in WO2011/154293 of CIMV.

As the fractionation takes place in an acid medium, the silica and residual lignin remain in the solid fraction and are not discharged in the liquid fraction. Consequently, the optional treatments of this liquid fraction no longer encounter the disadvantages due to the presence of silica.

The solid fraction obtained during step a) comprises cellulose. The cellulose included in this fraction preferably consists of the majority of the cellulose included in the lignocellulosic plant material.

The second step of the process according to the invention comprises the extraction of residual lignin and silica from the solid fraction obtained in step a) with a basic solution, at a pH between 10 and 13 and at a temperature between 70° C. and 90° C., so as to obtain a liquid phase comprising silica and a solid phase.

During this extracting step, the silica present in the solid fraction obtained in step a) dissolves in the form of silicate. The lignin present in the solid fraction of step a) is also solubilized in the extracting step. A liquid phase comprising silica and lignin and a solid phase comprising mainly cellulose are then obtained.

The extracting step may last between 30 and 60 min.

The extracting step b) is carried out at a pH between 10 and 13.

According to a preferred embodiment, the extracting step b) is carried out at a pH between 10.5 and 12.5, preferably between 10.5 and 11.5.

Such a pH range makes it possible to obtain silica and lignin particles with a diameter of a few micrometers. The role of the pH during the extracting step with regard to the size of the silica and lignin particles is particularly surprising. This is because so far, only the parameters of the precipitating step seemed to have an influence on the particle diameter.

The basic solution of the extracting step b), also referred to as extraction solution, can be a sodium hydroxide or potassium hydroxide solution.

The basic solution of the extracting step b) can, for example, comprise between 2% and 5% by weight of NaOH. Preferably, it comprises 1.5% by weight of NaOH.

The third step of the process according to the invention comprises separating the liquid phase and of the solid phase which are obtained in the extracting step b).

This separating step can be carried out by well known techniques for solid-liquid separation, for example by separation by settling, by filtration, for example via a filter press, or by centrifugation.

The process according to the invention can comprise a step of concentrating the liquid phase after the separating step c) and before the coprecipitating step d) in order to increase the coprecipitation yield.

Preferably, the liquid phase is concentrated so as to comprise 10% of dry material.

The fourth step of the process according to the invention comprises coprecipitating together silica and lignin comprised in the liquid phase at a pH between 5 and 6. The coprecipitation of silica and lignin comprised in the liquid phase can be carried out directly after the separating step c) without a prior concentrating step or after the concentrating step. Preferably, the coprecipitating step is carried out after a step of concentrating the liquid phase. By optimizing the conditions of the extracting step b), silica and lignin with a desired purity and a desired diameter are obtained. Thus, according to this process, it is no longer necessary to use specific coprecipitation conditions, for example, in order to reduce the diameter of the silica and lignin particles.

The coprecipitation of the silica and lignin at a pH between 5 and 6 can be carried out by the addition of an acid solution, preferably with an acid solution obtained by recycling the liquid fraction obtained subsequent to the separating step a2). The recycling of the acid solution makes it possible to limit the contribution of reactant and thus the cost of the process.

Likewise, in order to limit the contribution of reactant, the acid solution used during the fractionating step can also originate from the recycling of the liquid fraction.

Once lignin and silica have been coprecipitated together, the resulting mixture can be washed in order to remove the residual salts or any other impurity.

The coprecipitated silica and lignin can subsequently be filtered, for example by filtration on a centrifuge.

The mixture of lignin and silica is then recovered.

The lignin/silica mass ratio in the resulting mixture is between 85/15 and 50/50.

The silica extracted according to the process of the invention is of plant origin. In the context of the present invention this silica can also be designated as "biosilica".

The silica particles of the lignin/silica mixture obtained according to the process of the invention may exhibit a mean diameter, also known as $d_{50}$, of 3 μm to 200 μm. The mean diameter of the particles varies as a function of the extraction conditions. At a pH between 10.5 and 11.5, an apparent mean diameter of 1 μm to 10 μm can be obtained. It is thus no longer necessary to use additional steps, such as sonication, in order to reduce the size of the particles.

The lignin in the lignin/silica mixture is preferably is a chemically unmodified lignin with available functional groups as depicted in WO 2014/012924, C More preferably, the lignin in the lignin/silica mixture is Biolignin™. The different characteristics of Biolignin™ are described in WO 2014/012924.

The lignin, preferably Biolignin™, present in the lignin/silica mixtures obtained by the process of the invention has a $d_{50}$ of 10 μm to 400 μm. Particle size distribution $d_{50}$, also known as the median diameter, is the value of the particle diameter at 50% in the cumulative distribution. For example, if $d_{50}$=10 μm, then 50% of the particles in the sample are larger than 10 μm, and 50% smaller than 10 μm.

The invention also relates to the mixture of lignin and silica obtained according to the process of the invention. The lignin is preferably a chemically unmodified lignin, and more preferably Biolignin™.

The present invention further relates to the use of a mixture of lignin and silica obtained according to the process of the invention as a reinforcing filler for the mechanical reinforcement of elastomer polymers.

The present invention still further relates to an elastomer comprising a mixture of lignin and silica obtained according to the process of the invention.

An installation for the simultaneous extraction of silica and lignin from lignocellulosic plant material, is represented in FIG. 1. Such installation comprises:
- a fractionating unit:
- comprising an acid solution feed,
- suitable for separating a solid fraction and a liquid fraction, and
- comprising a liquid fraction outlet and a solid fraction outlet, the solid fraction outlet being connected to an extracting unit,
- the extracting unit:
- comprising a basic solution feed,
- being suitable for separating a solid phase and a liquid phase, and
- comprising a solid fraction outlet and a liquid phase outlet, the outlet of the liquid phase being connected to a precipitating unit,
- the precipitating unit comprising an acid solution feed.

The liquid fraction outlet of the fractionating unit is connected to a recycling unit suitable for recycling an acid solution. The recycling unit comprises a recycled acid solution outlet connected to the acid solution feed of the precipitating unit.

The invention will be illustrated below by FIG. 1 and the examples. However, these examples and FIGURES should not be interpreted so as to limit the scope of the present invention.

FIGURE

FIG. 1 represents a partial and schematic view of the process according to the invention and installation for carrying out the invention.

The lignocellulosic plant material is introduced via the pipe 1 into the reactor 3, in which the lignocellulosic plant material is brought into contact with an acid solution in order to obtain a solid fraction comprising cellulose and a liquid fraction comprising lignin and sugar. The acid solution is introduced into the reactor 3 via the pipe 2. The combination comprising the liquid and solid fractions is transferred into a press 4 in order to separate the two fractions. The reactor 3 and the press 4 form the fractionating unit 3,4.

The liquid fraction is sent to a recycling unit 16 via the liquid fraction outlet 5. The liquid fraction is treated therein by evaporation in order to obtain a recycled acid solution. This solution is recovered via the pipe 17. The other constituents of the liquid fraction can also be recovered via the outlet 18 and purified.

The solid fraction is sent to an extraction reactor via the pipe 6. The solid fraction is brought into contact therein with a basic extraction solution introduced via the pipe 8. This extracting step is carried out at a pH of between 10.5 and 11.5 at a temperature between 70° C. and 90° C. The silica and lignin present in the solid fraction then dissolve in the extraction solution, forming a liquid phase comprising silica and lignin and a solid phase comprising cellulose and depleted in silica and lignin.

The combination consisting of the solid phase and the liquid phase is subsequently introduced into a press 9 in order to separate them. The extraction reactor 7 and the press 9 form the extracting unit 7,9.

The solid phase thus separated is recovered via the pipe 10. This solid phase can be subjected to various treatments in order to recover in value the cellulose comprised therein.

The liquid phase comprising lignin and silica is concentrated in the unit 12 and then precipitated in the precipitating unit 13 by adjustment of the pH to a pH between 5 and 6. The adjustment of the pH is carried out by the recycled acid solution originating from the pipe 17.

The coprecipitated lignin and silica mixture is subsequently filtered in the filtration unit 14.

The coprecipitated mixture of lignin and silica is recovered via the pipe 15.

EXAMPLES

I. Biolignin™/Silica Mixtures

The Biolignin™/silica mixtures of the invention are made with Biolignin™ as described in WO 2014/012924 and a silica (hereafter biosilica or CIMV silica) as defined hereafter (Table 3).

For sake of comparison with the mixtures of the invention, mixtures of Biolignin™ with commercially available silica (Aerosil™) have been prepared by mixing the two powders and tested (Tables 1 and 2).

TABLE 1

| | I.1. Biolignin ™ 400 μm/commercial silica | | | | |
|---|---|---|---|---|---|
| Properties | Reference Carbon black (N220) 100 PHR | Assay 0 Biolignin ™ 400 μm 100 PHR | Assay 1 Biolignin ™ 400 μm 50 PHR + Commercial silica 50 PHR | Assay 2 Biolignin ™ 400 μm 75 PHR + Commercial silica 25 PHR | Assay 3 Biol Biol 400 μm 85 PHR + Commercial silica 15 PHR |
| hardness (ShA) | 88 | −2% | 5% | 2% | 1% |
| Breaking strength (N) | 138.76 | −44% | −22% | −19% | −21% |

The hardness of the Biolignin™ reinforced elastomers is very close to the reinforced carbon black reference. This hardness is improved by the addition of silica in the formulation.

The tensile strength of the Biolignin™ reinforced elastomer (assay 0) is reduced by 44% compared to the reference (carbon black reinforced).

For formulations containing Biolignin™ having a $d_{50}$ of 400 μm (assays 1-3), the elastomers obtained have a reduced tensile strength of about 20% relative to the reference, irrespective of the amount of silica added.

TABLE 2

| | I.2. Biolignine 10 µm/commercial silica | | | |
|---|---|---|---|---|
| Properties | Reference Carbon black N220 100 PHR | Assay 4 Biolignin ™ 10 µm 50 PHR + Commercial silica 50 PHR | Assay 5 Biolignin ™ 10 µm 75 PHR + Commercial silica 25 PHR | Assay 6 Biolignin ™ 10 µm 85 PHR + Commercial silica 15 PHR |
| Hardness (ShA) | 88 | 6% | 0% | 0% |
| Breaking strength (N) | 138.76 | −20% | −28% | −32% |

For formulations containing Biolignin™ having a $d_{50}$ of 10 µm (Assays 4-6), the amount of silica added seems to have a slight effect on the tensile strength of the final elastomer. Indeed, the tensile strength seems to increase with the amount of silica added.

TABLE 3

| | 1.3. Biolignin ™ 10 µm/Biosilica mixture according to the invention | | |
|---|---|---|---|
| Properties | Reference Carbon black N220 100 PHR | Assay 7 Biolignin ™ 10 µm 50 PHR + Biosilica 50 PHR | Assay 8 Biolignin ™ 10 µm 85 PHR + Biosilica 15 PHR |
| Hardness (ShA) | 88 | 0% | 1% |
| Breaking strength (N) | 138.76 | −10% | −25% |

As it appears from Table 3, the tensile strength is improved by the addition of Biosilica in the formulation (assays 7 and 8). The Biosilica is added at a level of 15 to 50 PHR.

The use of silica extracted by the CIMV process (Biosilica or CIMV silica) instead of the commercial silica in the formulations (assays 7 and 8) further improves the tensile strength of the final elastomers.

The formulation "assay 7", containing 50 PHR of Biolignin™ and 50 PHR of CIMV silica, makes it possible to obtain an elastomer with a hardness at least equivalent to that of the reference (i.e. carbon black) and a tensile strength decreased only by 10% with respect to the carbon black.

II. Simultaneous Extraction of a Mixture of Biolignin™/Biosilica for Use as an Elastomer Reinforcement To optimize the impact of the reinforcement of the Biolignin™/Biosilica mixture, extraction of the Biolignin™/Biosilice mixture was carried out by the CIMV method. For optimum reinforcement, the Biolignin™/Biosilice mass ratio in the mixture is between 85 PHR/15 PHR and 50 PHR/50 PHR.

Extraction and Co-Precipitation of the Biolignin™/Biosilice Mixture:

In order to obtain a mixture according to the invention in the appropriate mass ratio, i.e. 85 PHR/15 PHR and 50 PHR/50 PHR, extraction was carried out under the following conditions.

A) Extraction of Acetic Acid/Formic Acid/Water from Lignocellulosic Biomass (i.e. Wheat Straw)

A fractionating step was carried out with a solution of acetic acid/formic acid/water for a period of time of 3 hours, at a temperature of 105° C. and at pH of 3.

B) Extraction in Basic Medium of Silica (Biosilica) and Biolignin™

The extracting step was carried out with a 12% by weight of a sodium hydroxide solution, for a period of time of 60 minutes, at a temperature of 80° C. and at a pH of 10.5 or 12.5.

C) Co-Precipitation of the Biolignin™/Biosilica Mixture in an Acid Medium

The precipitating step was carried out with a 1% acetic acid solution, for a period of time of 10 minutes, at a temperature of 25° C. and at a pH of 5.5.

The Biolignin™ obtained by the extraction and co-precipitation process of the invention has $d_{50}$ of 10 to 400 µm, a specific surface area of between 0.5 m$^2$/g and 5 m$^2$/g, and preferably between 1 m$^2$/g and 2.5 m$^2$/g.

Some other characteristics of Biolignin™ are as follows:

said lignin has a low molecular weight and the Mw of which is between 700 g/mol and 2000 g/mol;

said lignin has a polydispersity index equal to approximately 1.3;

said lignin comprises available functional groups chosen from the group made up of aliphatic hydroxyls, phenolic hydroxyls and carboxylic acids;

the aliphatic hydroxyls are present at from 1.5 mmol/g to 3.0 mmol/g, preferably at 2.3 mmol/g;

the phenolic hydroxyls are present at from 1.1 mmol/g to 2.0 mmol/g, preferably in a content not less than 1.1 mmol/g;

the carboxylic acids are present at from 0.5 mmol/g to 1.5 mmol/g, preferably in a content equal to approximately 1.0 mmol/g.

The biosilica obtained by the extraction and co-precipitation process of the invention has the following characteristics:

| Biosilica particles | Extraction at pH = 10.5 | Extraction at pH = 12.5 |
|---|---|---|
| Mean diameter by laser particle sizing | 4.8 µm | 176 µm |
| Specific surface by the BET method | 155.93 m$^2$/g | 413.46 m$^2$/g |
| Cumulative pore volume by the BJH adsorption method | 0.28 cm$^3$/g | 1.21 cm$^3$/g |
| Mean pore diameter by the BJH adsorption method | 8.23 nm | 11.07 nm |
| Median pore diameter | 0.94 nm | 0.93 nm |

These results show that the size of the silica particles decreases greatly with the pH of the extraction solution.

Use of Biolignin™/Biosilice Mixture According to the Invention for Elastomer Reinforcement The resulting Biolignin™/biosilica mixture is in a mass ratio of 50 PHR/50 PHR to 85 PHR/15 PHR, and is used for elastomer reinforcement.

The elastomer reinforced with a Biolignin™/Biosilice mixture has
- a hardness equivalent to or greater than an elastomer reinforced with the reference (carbon black) only; and
- breaking strength values, at least equal to the values of the Biolignin™/Biosilice mixture shown in Table 3.

The invention claimed is:

1. A process for the simultaneous extraction of lignin and silica from lignocellulosic plant material, comprising:
   a) fractionating the lignocellulosic plant material in the presence of an acid solution comprising at least 50% by weight of acetic acid and at least 20% by weight of formic acid, so as to obtain a solid fraction comprising cellulose, residual lignin and silica;
   b) extracting simultaneously lignin and silica from the solid fraction obtained in step a) with a basic solution, at a pH between 10 and 13 and at a temperature between 70° C. and 90° C., so as to obtain a liquid phase comprising lignin and silica, and a solid phase;
   c) separating the liquid phase and the solid phase obtained in step b),
   d) coprecipitating a mixture of lignin and silica comprised in the liquid phase, at a pH between 5 and 6.

2. The process for the simultaneous extraction of lignin and silica according to claim 1, wherein the extracting step b) is carried out at a pH between 10.5 and 11.5.

3. The process for the simultaneous extraction of a mixture of lignin and silica according to claim 1, wherein the fractionating step a) comprises the steps of:
   a1) bringing the lignocellulosic plant material into contact with the acid solution, so as to obtain the solid fraction and a liquid fraction, and
   a2) separating the solid fraction and the liquid fraction obtained in step a1).

4. The process for the simultaneous extraction of lignin and silica according to claim 3, wherein the coprecipitating step d) is carried out with an acid solution obtained by recycling the liquid fraction obtained subsequent to the separating step a2).

5. The process for the simultaneous extraction of lignin and silica according to claim 1, wherein the basic solution of the extracting step b) comprises 1.5% by weight of NaOH.

6. The process for the simultaneous extraction of lignin and silica according to claim 1, wherein the lignocellulosic plant material is cereal straw and/or chaff.

7. The process for the simultaneous extraction of lignin and silica according to claim 1, comprising a step of concentrating the liquid phase after the separating step c) and before the coprecipitating step d).

8. The process for the simultaneous extraction of lignin and silica according to claim 1, further comprising a step of filtration of the silica and lignin coprecipitated in step d).

* * * * *